United States Patent [19]

Bjerre et al.

[11] Patent Number: 4,559,231
[45] Date of Patent: Dec. 17, 1985

[54] PROCESS FOR INCREASING THE CAPACITY OF SYSTEMS FOR MEMBRANE FILTRATION OF MILK OR MILK PRODUCTS

[75] Inventors: Poul Bjerre, Silkeborg; Ernst Büchbjerg, Videbaek, both of Denmark

[73] Assignee: Pasilac A/S, Silkeborg, Denmark

[21] Appl. No.: 496,301

[22] Filed: May 19, 1983

[30] Foreign Application Priority Data

Oct. 21, 1982 [DK] Denmark .............................. 4677/82

[51] Int. Cl.$^4$ ............................ A23C 9/12; A23C 1/00
[52] U.S. Cl. ......................................... 426/42; 426/34; 426/36; 426/491
[58] Field of Search ....................... 426/42, 34, 36, 491

[56] References Cited

U.S. PATENT DOCUMENTS

| | | | |
|---|---|---|---|
| 3,947,598 | 3/1976 | Stenne | 426/36 |
| 3,963,837 | 6/1976 | Maubois et al. | 426/36 |
| 4,033,822 | 7/1977 | Gregor | 426/34 |
| 4,131,688 | 12/1978 | Grosclaude et al. | 426/491 |
| 4,205,090 | 5/1980 | Maubois et al. | 426/36 |
| 4,268,528 | 5/1981 | Montigny | 426/36 |

FOREIGN PATENT DOCUMENTS

| | | | |
|---|---|---|---|
| 0470246 | 3/1974 | Australia | 426/34 |
| 129556 | 10/1974 | Denmark | 426/42 |
| 2728105 | 4/1979 | Fed. Rep. of Germany | 426/42 |
| 2475361 | 8/1981 | France | 426/36 |
| 7402658 | 8/1974 | Netherlands | 426/36 |
| 8122195 | 7/1981 | United Kingdom | 426/42 |

OTHER PUBLICATIONS

Bennasar, M., et al., "Ultrafiltration of Milk on Mineral Membranes: Improved Performance," Journal of Soc. of Dairy Tech., Apr. 1982, pp. 43–49.
Ernstrom, C. A., "Cheese Base for Processing a High Yield Product from Whole Milk by Ultrafiltration," Journal of Dairy Science, Feb. 1980, pp. 228–234.

*Primary Examiner*—Christine M. Nucker
*Attorney, Agent, or Firm*—Lowe, King, Price & Becker

[57] ABSTRACT

A process for increasing the capacity of plants for membrane filtration of milk or milk products, whereby prior to the membrane filtration, the milk or milk product is usually subjected to one or more pretreatments selected from the following:

(a) heat treatment for bacteriological reasons,
(b) fat standardization in view of the fat content of the product,
(c) homogenization in view of the physical and organoleptic properties of the end product, and
(d) pre-acidulation in order to influence the solubility of the ash components of the milk.

According to this process, prior to the membrane filtration, said milk or milk product is additionally subjected to an enzymatic treatment with curdling enzyme under agitation of the milk or milk product to form an integrated dispersion of a coagel in whey. The resulting concentrate may be used as feeding additive or feeding starting material as well as a nutritive medium by microbial processes.

16 Claims, No Drawings

PROCESS FOR INCREASING THE CAPACITY OF SYSTEMS FOR MEMBRANE FILTRATION OF MILK OR MILK PRODUCTS

FIELD OF THE INVENTION

The present invention relates to a process for increasing the capacity of systems for membrane filtration of milk or milk products, wherein, prior to the membrane filtration, the milk is usually subjected to one or more pre-treatment steps including one or more of the following steps:

(a) heat treatment for bacteriological reasons, (b) fat standardization in view of the fat content of the product, (c) homogenization in view of the physical and organoleptic properties of the end product, and (d) pre-acidulation in order to influence the solubility of the ash components of the milk.

More particularly, the invention relates to a process, whereby it is possible to obtain an increase in the capacity of a membrane filtration system by filtering enzymatically curdled milk or milk product.

BACKGROUND ART

Danish patent specification No. 129,556 discloses a process for membrane filtration of milk or milk products for the preparation of an aqueous concentrate with a high content of protein substances, said process being carried out without additions of enzymes or chemicals such as acids or bases.

Journal of the Society of Dairy Technology, vol. 35, No. 2, April 1982, page 43 and the following pages, discloses ultrafiltration of non-curdled preacidulated milk. As it appears from the article on page 46, it is not of particularly great importance to the filtration capacity whether the filtration is carried out on pre-acidulated or normal milk.

SUMMARY OF THE INVENTION

It is accordingly one object of the present invention to provide an improved milk or milk product for introduction to membrane filtration.

A further object of the invention is to subject milk or milk products to an enzymatic treatment with curdling enzyme prior to introduction to membrane filtration.

Other objects and advantages of the present invention will become apparent as the description thereof proceeds.

In satisfaction of the foregoing objects and advantages, there is provided by the present invention a process for increasing the capacity of membrane filtration systems for milk or milk products, whereby prior to the membrane filtration, the milk or the milk product is normally subjected to one or more of the following pre-treatment steps:

(a) heat treatment;

(b) fat standardization;

(c) homogenization; and (d) pre-acidulation;

the improved process comprising subjecting said milk or milk product, prior to the membrane filtration, to a further pretreatment in the form of an enzymatic treatment with curdling enzyme under agitation of the milk or milk product to form an integrated dispersion of a coagel in whey.

DESCRIPTION OF PREFERRED EMBODIMENTS

The characteristic feature of the process according to the present invention is that said milk or milk product, prior to the membrane filtration, is additionally subjected to an enzymatic treatment with a curdling enzyme under agitation of the milk or milk product to form an integrated dispersion of a coagel in whey.

In this manner a surprisingly large capacity of the membrane filtration system is obtained so that a smaller system can be used for the same amount of milk compared to known techniques. In addition less expenses of upkeep of the membranes are involved, less energy is consumed, less room is necessary, and less investments are necessary.

The concentrate obtained by the process according to the invention may also be further concentrated to a dry matter content of up to about 73% by weight without involving a tendency for visible, free fat to appear in the product. In comparison it can be mentioned that by the preparation of so-called Cheese-Base from a concentrate obtained by the traditional process, which for instance has been described in 1980, J. Dairy Sci. 63:228–234 and the British patent application No. 8,122,195 filed on July 17, 1981, a dry matter content of 60% by weight should be considered the upper limit, since a higher dry matter content causes the fat of the product to be damaged, which causes an undesired content of free fat in the Cheese-Base.

The concentrate prepared according to the invention is particularly suited for the production of Cheese-Base. The enzymatic curdling implies that a concentrate prepared according to the invention does not possess quite the same characteristic properties as known by common ultrafiltered concentrates. When a non-acidulated milk product has been used as starting material by the process according to the invention, the concentrate obtained according to the invention is sweet. The concentrate may either be acidulated to a desired pH and subsequently be evaporated to a desired dry matter content or starter may be added immediately before an evaporation whereafter the concentrate is evaporated to a desired dry matter content. The acidulation to a desired pH is carried out by means of the starter added immediately before an evaporation.

In comparison with the traditionally ultrafiltered concentrate, the additionally concentrated product obtained on the basis of the concentrate prepared according to the invention may have a slightly grainy consistency, which, however, decreases essentially after the evaporation.

The above grainy consistency in the retentate and consequently also in the end product may be avoided or removed by subjecting the retentate to a suitable additional treatment, such as for instance pumping through a homogenization nozzle or other weak homogenization.

A preferred embodiment of the process according to the invention is characterized in that the enzymatic reaction is carried out in portions during a constant stirring. As a result, a mixture of small grains and whey is formed. By carrying out the enzymatic reaction in small portions it is possible to ensure that the membrane filtration system is fed with a homogeneous material so as to thereby obtain a homogeneous end product.

According to a second preferred embodiment of the process according to the invention, the curdling is carried out in a continuous system during constant stirring to form a mixture of small grains and whey. Rennet curdling during stirring has never previously been connected with a following cheesing process. Previously it was always necessary to carry out the curdling of milk for the production of cheese calmly or without stirring in order to ensure achievement of as homogeneous a coagulatum as possible. Curdling during stirring usually causes formation of an unstable coagulum, which in the traditional production of cheese, causes an increased loss of "fines" (small cheese grains/cassein grains), which are drained off together with the whey. In the present invention, the formation of these small coagel grains (fines) is desired as it has been discovered that these small grains are the actual causes of obtaining the surprisingly increased or larger capacity of the membrane filtration system since these grains decompose the secondary membrane usually formed or deposited on the filtration membrane.

When the enzymatic reaction causing curdling takes place in a continuous system, it is advantageous that the reaction comprise two steps, viz. a first step at a low temperature, e.g. below about 10° C., usually 5°–0° C., with a standing time of up to about 6 hours, and a second step which is the curdling phase and which is carried out at a temperature above the curdling temperature, e.g. above 25° C., usually 30°–50° C., dependent on the membrane filtration temperature. The reaction time at 30° C. is over a period of about 75 seconds and at 50° C. almost instantaneous, provided the temperature is 2° C. for about 5 hours in the first phase. By operating with differentiated temperatures during the enzymatic reaction, the actual curdling time and consequently the volume of the necessary system for the continuous curdling are drastically reduced. The temperature of the second step corresponds advantageously to the operational temperature of the membrane filtration system in such a manner that the product resulting from the curdling may enter the membrane filtration system directly.

In the process according to the invention, the curdling phase takes place in the second step during a constant turbulent flow. Curdling during vigorous stirring or the like is inapplicable to the traditional cheesing technique.

By the process according to the invention rennet is most suitable as the curdling enzyme although other curdling enzymes can be used. As examples of suitable rennet enzymes, both animal and microbial rennet enzymes can be mentioned. In the following scheme a number of applicable rennet enzymes are mentioned.

| Trade Name | Type | Producer | Country of Production |
|---|---|---|---|
| Hannilase | Microbial | Chr. Hansens Laboratorium | Denmark |
| Standard | Animal | Chr. Hansens Laboratorium | " |
| Stabo | " | Chr. Hansens Laboratorium | " |
| Stamix | " | Chr. Hansens Laboratorium | " |
| Fifty-fifty | " | Chr. Hansens Laboratorium | " |
| Rennilase | Microbial | Novo | " |
| Marzyme-I | " | Marshall | U.S.A. |
| Marzyme-II | " | " | " |
| New Marzyme | " | " | " |
| Animal rennant | Animal | " | " |

By the tests described in the following Examples Chr. Hansen Standard was used as rennet which possesses a strength of 15,000 Soxhlet degrees. When products having lower strength are used, longer reaction periods are necessary.

According to the invention it is possible to treat all types of milk or milk products, which include natural animal milk or fat standardized milk of the same origin including treated milk such as pasteurized milk as well as recombined milk including recombined milk both containing animal and vegetable fat, which, if desired, may be treated as stated above.

The resulting concentrate may be used as feeding additive or feed starting material and may also be used as a nutritive medium in microbial processes. The process according to the invention is particularly suitable in connection with a Cheese-Base production. Cheese-Base prepared on the basis of the concentrate according to the invention may be used as starting material for the preparation of process cheese.

The milk or milk product to be treated is usually subjected to one or more pre-treatments selected from the following:

(a) heat treatment for bacteriological reasons,
(b) fat standardization in view of the fat content of the product,
(c) homogenization in view of the physical and organoleptic properties of the end product, and
(d) pre-acidulation in order to influence the solubility of the ash components of the milk.

All these treatments are known per se and require no further explanations. It should, however, be mentioned in connection with pre-treatment (d) that the pre-acidulation must, of course, only be carried out to such a pH that no acid curdling takes place since it is not possible to carry out an enzymatic curdling after an acid curdling.

The milk product pre-treated in the manner according to the invention is subsequently subjected to an enzymatic treatment with a curdling enzyme under agitation of the milk or milk product. The treatment is advantageously carried out with stirring and may be carried out either in portions or continuously. As mentioned it is possible, if desired, to keep the temperature of the curdled product at a temperature corresponding to the operational temperature of the membrane filtration system used for the following membrane filtration.

As suitable membrane filtration systems, conventional ultrafiltering systems can be mentioned, optionally combined with equipment for diafiltration.

The present invention will be illustrated below by means of Examples, of which one Example is a comparative Example.

EXAMPLE I

Preparation of Retentate for the Preparation of Cheese-Base

Milk was pasteurized at 72° C. for 15 sec. and cooled to 40° C. and subsequently placed in a tank with vigorous stirring. 30 ml of rennet, Chr. Hansen Standard, were added per 100 kg of milk. During a period of about 25 minutes the curdling was terminated and by means of a centrifugal pump, the curdled milk was transferred to the feeding tank (1000l) of an ultrafiltration system, said tank being provided with a propeller-driven stirrer. The ultrafiltration was carried out at 40°–44° C., a mean pressure of 4–5 bar by means of DDS ultrafiltration system type 37 equipment with GR-51-PP-membranes, whereby a flux of 110 l/m$^2$/h was obtained at a dry matter content of 40% by weight in the concentrate.

The results obtained are stated in the following Table.

EXAMPLE II (Comparative Example)

Milk was pasteurized at 72° C. for 15 seconds and cooled to 50° C. In a system corresponding to the system of Example I an ultrafiltration was carried out at 50° C., a mean pressure of 4–5 bar, and with GR-61-pp-membranes, whereby a flux of 10–12 l/m$^2$/h was obtained at a dry matter content of 40% by weight in the concentrate.

The results obtained are stated in the following Table.

TABLE

| Component | Milk | Example I | | Example II | |
|---|---|---|---|---|---|
| | | Concentrate | Permeate | Concentrate | Permeate |
| Fat (1) | 3.10 | 18.14 | 0.00 | 17.05 | 0.00 |
| Protein (2), calculated as N % | 3.39 | 17.22 | 0.52 | 17.72 | 0.21 |
| Dry matter (3) | 11.94 | 40.06 | 6.2 | 39.92 | 5.3 |
| Consumption (kg milk/kg concentrate) | | 5.9 | | 5.5 | |
| Flux l/m$^2$/h at 40% TS | | 110 | | 10–12 | |

Explanation of the Table:
(1) According to Gerber.
(2) Kjeldahl - N multiplied with 6.38.
(3) (a) Milk: 4 h at 105° C.
(b) UF-concenttrate: about 2 g + 5 ml distilled H$_2$O, dried for 16 h at 105° C.

The use of the GR-51-PP-membrane in Example II provides corresponding data as obtained when using the GR-61-PP-membrane, viz. 10–12 l/m$^2$/h.

As will be noted from the Table, a substantial increase in capacity of a membrane filtration system is obtained. This is shown by the surprisingly higher flux obtained according to the invention.

By the process of the invention, it is also possible to membrane filter up to a very high dry matter content without the viscosity being impeded.

The increase of the capacity obtained by the process according to the invention is not only surprising, but also surprisingly great since the capacity obtained is even greater than the capacity known by membrane filtration of pure whey.

We claim:

1. In a process for increasing the capacity of membrane filtration systems for milk or milk products, whereby prior to the membrane filtration, the milk or the milk product is normally subjected to one or more of the following pre-treatment steps:
    (a) heat treatment for bacteriological reasons,
    (b) fat standardization in view of the fat content of the product,
    (c) homogenization in view of the desired physical and organoleptic properties of the end product, and
    (d) pre-acidulation in order to influence the solubility of the ash components of the milk,
the improved process comprising subjecting said milk or milk product, prior to the membrane filtration, to a further pretreatment in the form of an enzymatic treatment with curdling enzyme under agitation of the milk or milk product to form an integrated dispersion of a coagel in whey.

2. A process as claimed in claim 1, wherein the enzymatic reaction is carried out in portions during constant stirring.

3. A process as claimed in claim 1 wherein the enzymatic reaction takes place in a continuous system with constant stirring.

4. A process as claimed in claim 3, where the enzymatic reaction comprises a first step at low temperature of below about 10° C., and a second step which is a very quick curdling phase and which is carried out at a temperature above the curdling temperature, wherein the curdling phase takes place during a constant turbulent flow.

5. A process as claimed in claim 1 wherein the enzyme is rennet.

6. A process as claimed in claim 1 wherein the curdling enzyme is rennet which has a strength of 15,000 Soxhlet degrees and is used in an amount of at least 10 g/100 l of milk product.

7. A method according to claim 4 wherein the first step is carried out at a temperature of about 2° C.

8. A method for membrane filtration of milk or milk products which comprises the steps of
    (a) subjecting said milk or milk products to an enzymatic treatment with a curdling enzyme under agitation of the milk or milk product to form an integrated dispersion of a coagel in whey.

9. A method according to claim 8 wherein the enzymatic reaction is carried out by contacting the milk or milk product with a microbial or animal enzyme with stirring for a sufficient time to form small grains of the mixture.

10. A method according to claim 9 wherein the enzymatic reaction comprises a first step conducted at a low temperature of below about 10° C., and a second step which is carried out at a temperature above the curdling temperature of about 25° C., wherein the curdling phase takes place during constant turbulent flow.

11. A process as claimed in claim 9 wherein the enzyme is rennet.

12. A process as claimed in claim 1 wherein rennet having a strength of 15,000 Soxhlet degrees is used as the curdling enzyme and is used in an amount of at least 10 g/100 l of milk product.

13. A method for membrane filtration of milk or milk products which comprises the steps of
    (a) pre-treating said milk or milk products,
    (b) subjecting said milk or milk product to an enzymatic treatment with a curdling enzyme under agitation of the milk or milk product to form an integrated dispersion of a coagel in whey.
    (c) subjecting said enzyme-treated milk or milk product to membrane filtration.

14. A method according to claim 13 wherein the curdling enzyme is a microbial or animal enzyme.

15. A method according to claim 13 wherein said pre-treating comprises one or more of the following steps:
    (a) heat treatment;
    (b) fat standardization;

(c) homogenization; or
(d) pre-acidulation.

16. A method according to claim 13 wherein the enzyme is rennet and the enzyme treatment is carried out in a first stage at a temperature of below about 10° C. and in a second stage at a temperature of above about 25° C., said second stage being carried out under turbulence to produce curdling.

* * * * *